(12) United States Patent
Takata

(10) Patent No.: US 11,731,487 B2
(45) Date of Patent: Aug. 22, 2023

(54) VEHICLE VENTILATION CONTROL SYSTEM

(71) Applicant: AISIN CORPORATION, Aichi (JP)

(72) Inventor: Yosuke Takata, Kariya (JP)

(73) Assignee: AISIN CORPORATION, Kariya (JP)

( * ) Notice: Subject to any disclaimer, the term of this patent is extended or adjusted under 35 U.S.C. 154(b) by 726 days.

(21) Appl. No.: 16/747,594

(22) Filed: Jan. 21, 2020

(65) Prior Publication Data

US 2020/0247214 A1   Aug. 6, 2020

(30) Foreign Application Priority Data

Feb. 1, 2019 (JP) .................. 2019-016755

(51) Int. Cl.
*B60H 1/00* (2006.01)
*B60H 1/26* (2006.01)

(52) U.S. Cl.
CPC ..... *B60H 1/00742* (2013.01); *B60H 1/00657* (2013.01); *B60H 1/00771* (2013.01); *B60H 1/265* (2013.01); *B60H 2001/00733* (2019.05)

(58) Field of Classification Search
CPC ............ B60H 1/00742; B60H 1/00657; B60H 1/00771; B60H 1/265; B60H 1/00735; B60H 1/00785; B60H 1/00821; B60H 1/00892; B60H 2001/00733
See application file for complete search history.

(56) References Cited

U.S. PATENT DOCUMENTS

| 4,852,469 | A | * | 8/1989 | Chuang | B60H 1/00785 454/75 |
| 5,054,686 | A | * | 10/1991 | Chuang | E05F 15/41 236/1 R |
| 5,222,661 | A | * | 6/1993 | Wenhart | B60J 7/0573 454/75 |
| 5,238,447 | A | * | 8/1993 | Weissbrich | B60H 1/00821 454/75 |
| 5,259,814 | A | * | 11/1993 | Weissbrich | B60H 1/00807 454/75 |
| 11,040,593 | B1 | * | 6/2021 | Chen | E05F 15/71 |
| 2004/0194479 | A1 | * | 10/2004 | Umebayashi | G08C 17/00 62/236 |

(Continued)

FOREIGN PATENT DOCUMENTS

JP   2004-256092 A   9/2004
JP   2004-306780 A   11/2004

(Continued)

OTHER PUBLICATIONS

Notice of Reasons for Refusal dated Nov. 22, 2022 in Japanese Patent Application No. 2019-016755 (with English language translation), citing documents 15-18 therein, 8 pages.

*Primary Examiner* — Travis Ruby
(74) *Attorney, Agent, or Firm* — Oblon, McClelland, Maier & Neustadt, L.L.P.

(57) ABSTRACT

A vehicle ventilation control system includes: a reception unit that receives an instruction signal input by a user via wireless communication; and a control unit that controls ventilation inside a vehicle based on the instruction signal, in which the control unit performs ventilation control to control the ventilation based on the instruction signal input during a period after the user gets out of the vehicle to next boarding.

4 Claims, 4 Drawing Sheets

(56) References Cited

U.S. PATENT DOCUMENTS

| | | | | |
|---|---|---|---|---|
| 2008/0083834 | A1* | 4/2008 | Krebs | F24F 11/62 |
| | | | | 237/2 A |
| 2009/0055046 | A1* | 2/2009 | Harumoto | B60H 1/00771 |
| | | | | 701/36 |
| 2009/0130966 | A1* | 5/2009 | Tucker | B60H 1/248 |
| | | | | 454/75 |
| 2009/0193825 | A1* | 8/2009 | Hara | B60H 1/00828 |
| | | | | 62/132 |
| 2010/0235046 | A1* | 9/2010 | Proefke | F02N 11/0807 |
| | | | | 236/91 D |
| 2012/0267442 | A1* | 10/2012 | Choi | B60H 1/00778 |
| | | | | 236/51 |
| 2014/0262132 | A1* | 9/2014 | Connell | B60H 1/00457 |
| | | | | 165/96 |
| 2015/0306940 | A1* | 10/2015 | Salter | B60H 1/00742 |
| | | | | 701/49 |
| 2016/0114650 | A1* | 4/2016 | Kwark | B60H 1/00742 |
| | | | | 701/2 |
| 2016/0207374 | A1* | 7/2016 | Gauthier | B60H 1/00742 |
| 2017/0225540 | A1 | 8/2017 | Ito | |
| 2017/0225541 | A1 | 8/2017 | Shimoda et al. | |
| 2017/0368905 | A1* | 12/2017 | Li | B60W 10/30 |
| 2018/0222284 | A1* | 8/2018 | Robert | B60H 1/00821 |
| 2020/0223285 | A1* | 7/2020 | Hoshino | B60H 1/00821 |
| 2021/0023910 | A1* | 1/2021 | Rogers | B60H 1/00964 |

FOREIGN PATENT DOCUMENTS

| | | |
|---|---|---|
| JP | 2013-256199 A | 12/2013 |
| JP | 2015-178298 A | 10/2015 |
| JP | 2016-088263 A | 5/2016 |
| JP | 2016-117327 A | 6/2016 |

* cited by examiner

VEHICLE VENTILATION CONTROL SYSTEM

CROSS REFERENCE TO RELATED APPLICATIONS

This application is based on and claims priority under 35 U.S.C. § 119 to Japanese Patent Application 2019-016755, filed on Feb. 1, 2019, the entire contents of which are incorporated herein by reference.

TECHNICAL FIELD

This disclosure relates to a vehicle ventilation control system that controls ventilation of a vehicle after a user gets off the vehicle.

BACKGROUND DISCUSSION

JP-A-2016-88263 and JP-A-2016-117327 (References 1 and 2) disclose techniques for improving comfort of a user by ventilating a vehicle immediately before the user boards the vehicle.

In a vehicle ventilation control system described in Reference 1, when a portable device carried by a user approaches a vehicle and enters a predetermined detection area, an ignition switch of the vehicle is turned on to open a window on a side where the user is approaching and an air blower is operated. As a result, the in-vehicle temperature is lowered before the user boards the vehicle and a window on the side where the user is approaching is opened to improve security by visual observation of the user.

A vehicle ventilation control system described in Reference 2 controls a pre-air conditioning operation mode based on GPS information of a portable device carried by a user and GPS information of a vehicle. Specifically, time required for the user to board the vehicle is calculated from the GPS information and an air conditioner is controlled so that the in-vehicle temperature can reach a target temperature within required time. As a result, the in-vehicle temperature is optimized immediately before boarding.

In the vehicle ventilation control system described in Reference 1, since the air blower is operated and the window is opened after the portable device enters the predetermined detection area, there is room for improvement in improving comfort of the user due to insufficient ventilation.

In the vehicle ventilation control system described in Reference 2, it is necessary for the vehicle to always receive the GPS information of the vehicle itself and the GPS information of the portable device since the pre-air conditioning operation mode is controlled based on GPS information, leaving room for improvement from a viewpoint of battery power consumption. In addition, even if the temperature inside the vehicle can be optimized immediately before boarding, not every case can be handled since, for example, fresh food will deteriorate when the user leaves the vehicle for a certain period of time leaving fresh food in the vehicle.

Thus, a need exists for a vehicle ventilation control system which is not susceptible to the drawback mentioned above.

SUMMARY

A feature of a vehicle ventilation control system according to an aspect of this disclosure resides in that the vehicle ventilation control system includes a reception unit that receives an instruction signal input by a user via wireless communication, and a control unit that controls ventilation inside a vehicle based on the instruction signal, in which the control unit performs ventilation control to control the ventilation based on the instruction signal input during a period after the user gets out of the vehicle to next boarding.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a vehicle ventilation control system according to this disclosure will be described below with reference to drawings. In the present embodiment, a vehicle ventilation control system X provided in an automobile C (an example of a vehicle) capable of locking and unlocking a door D by a remote key 1 (a portable device) capable of two-way wireless communication will be described as an example of the vehicle ventilation control system. However, this disclosure is not limited to the following embodiment and various modifications can be made without departing from the scope of this disclosure.

[Overall Configuration]

Figure 1:
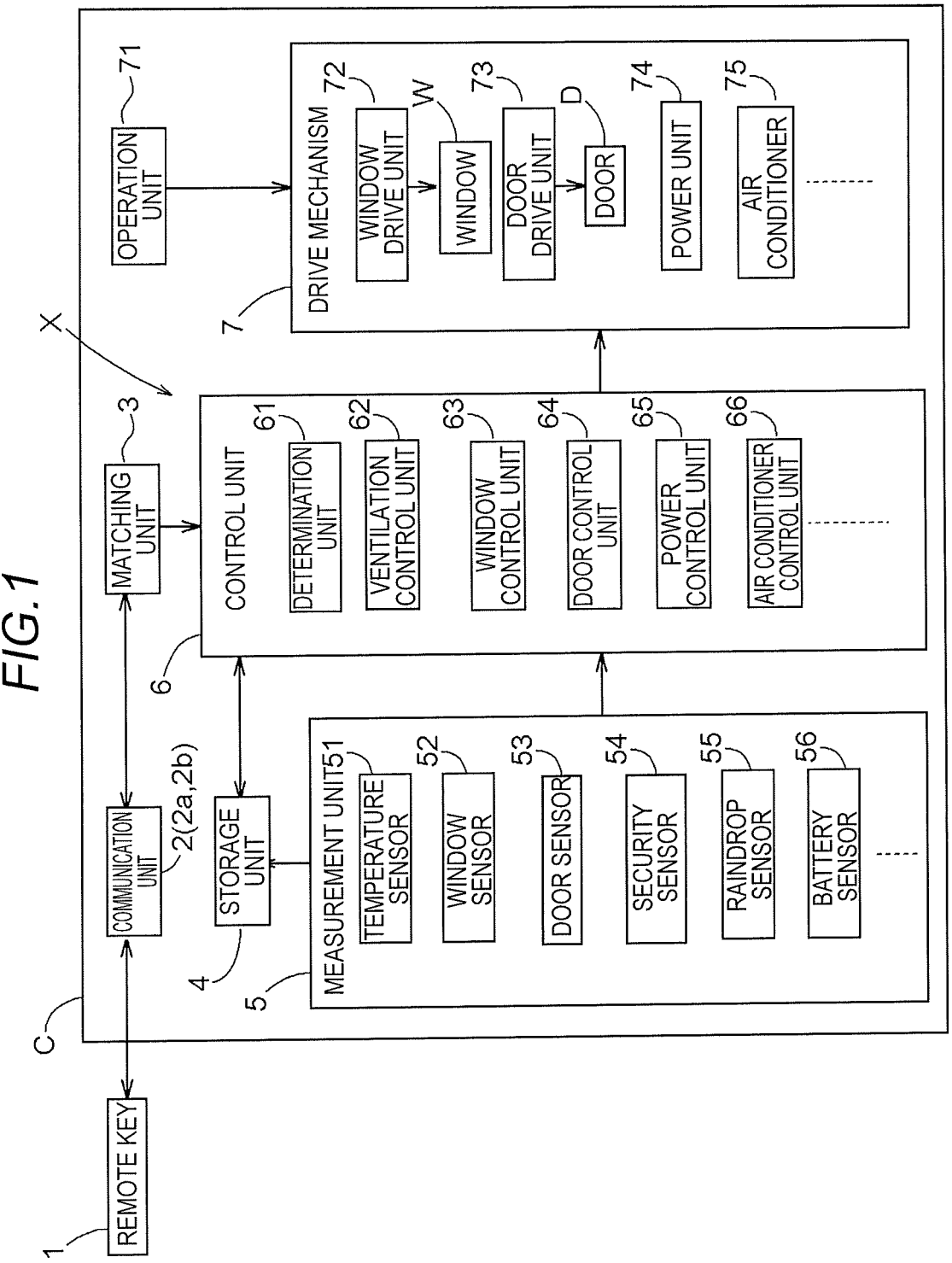
FIG. 1 is a block diagram showing a configuration of a vehicle.

As shown in FIG. 1, the automobile C is capable of two-way wireless communication (short-range wireless communication) with the remote key 1 via a communication unit 2. The remote key 1 is capable of long-range wireless communication with the automobile C by the Internet. The remote key 1 includes a door locking button, a door unlocking button, a back door opening activation button, a ventilation button, and the like. A smartphone or the like (not shown) may be used to enable communication with the automobile C by the Internet or the like.

The automobile C includes the communication unit 2, a matching unit 3, a storage unit 4, a measurement unit 5, a control unit 6 (controller), an operation unit 71, and a drive mechanism 7. The communication unit 2 is a communication interface that performs two-way wireless communication (the short-range wireless communication) at a predetermined frequency with the remote key 1 and receives an instruction signal, weather information, and the like from the remote key 1 via the Internet (the long-range wireless communication).

The matching unit 3 and the control unit 6 function as a part of an electronic control unit (ECU) and are constituted by software including a CPU that executes various types of processing and memory as the core, or a combination of hardware and software. The storage unit 4 is constituted by hardware such as a RAM or an HDD. The measurement unit 5 includes various sensors that detect a driving state of the automobile C and peripheral information. The drive mechanism 7 includes a device that receives a control signal from the ECU and drives various functions of the automobile C. The matching unit 3, the storage unit 4, the measurement unit 5, the control unit 6, the operation unit 71, and the drive mechanism 7 are electrically connected via CAN (registered trademark, Controller Area Network), Local Interconnect Network (LIN), or the like.

The communication unit 2 includes a transmission unit 2a, a reception unit 2b, and an antenna (not shown) provided in a front door or the like. The transmission unit 2a intermittently transmits a request signal from an antenna of the automobile C to the remote key 1. The reception unit 2b receives a response signal in response to the request signal from the remote key 1 via the antenna. In addition, the reception unit 2b receives an instruction signal input by a user via various buttons of the remote key 1 via the Internet or the short-range wireless communication, and receives various types of information such as weather information and position information via the Internet or the like.

Upon receiving the response signal from the remote key 1 in a detection area, the matching unit 3 matches the response signal with an authentication signal. When the response signal and the authentication signal match with each other as a result of the matching by the matching unit 3, a door control unit 64, which will be described later, causes a door drive unit 73 to lock and unlock the door D of the automobile C. Here, the detection area is an area (for example, a short distance of about 5 m from the automobile C) where the user can see the automobile C and the communication unit 2 can transmit and receive the response signal of the remote key 1.

The storage unit 4 stores various programs that execute the functions of the control unit 6. The various programs are temporarily read out to the memory of the ECU. The storage unit 4 also stores a measurement result of the measurement unit 5 and a ventilation mode executed by a ventilation control unit 62 to be described later.

The measurement unit 5 includes a temperature sensor 51, a window sensor 52, a door sensor 53, a security sensor 54 (an example of a detection sensor), a raindrop sensor 55, a battery sensor 56, and the like. A measurement result of the measurement unit 5 is stored in the storage unit 4 and is transmitted from the storage unit 4 to the control unit 6 in response to a request from the control unit 6. The measurement result of the measurement unit 5 may be transmitted from the measurement unit 5 to the control unit 6 in response to a request from the control unit 6 without being stored in the storage unit 4.

The temperature sensor 51 includes a thermistor or the like that measures the internal temperature of the automobile C (hereinafter, referred to as an "in-vehicle temperature T"). The window sensor 52 is a position sensor attached to a window W of the automobile C to detect an opening degree of the window W. The door sensor 53 is a position sensor that detects an opening degree of the door D and detects locking or unlocking of the door D.

The security sensor 54, which is a sensor that detects an intrusion or the like into the automobile C (hereinafter, referred to as "in-vehicle"), includes a vibration sensor that detects vibration of a vehicle body or a camera that images the inside or outside of the vehicle and detects a person other than the user who touches the automobile C. For example, an intrusion is detected by the vibration sensor when the window W is split, and a person who has a possibility of intrusion is detected by a camera outside the vehicle when a suspicious person is outside the vehicle for a predetermined period of time. The raindrop sensor 55 is a sensor that detects a rainfall amount and is attached to a fixing portion or the like of a wiper. The battery sensor 56 is a sensor that detects a remaining battery amount of a battery and includes a voltage sensor or the like that measures a voltage value output from the battery.

The control unit 6 includes a determination unit 61, the ventilation control unit 62, a window control unit 63, a door control unit 64, a power control unit 65, and an air conditioner control unit 66. The drive mechanism 7 includes a window drive unit 72, a door drive unit 73, a power unit 74 (an example of an engine), an air conditioner 75, and the like. The operation unit 71 is an interface operable by a user to activate the drive mechanism 7 and includes an ignition switch, a touch panel, various operation buttons, and the like.

The determination unit 61 determines whether the power unit 74 is operated based on an on and off signal of the ignition switch. The determination unit 61 also determines an operation state of the door drive unit 73 based on a response signal (inside and outside of the detection area) from the remote key 1 and an instruction signal (locking and unlocking) input by the user by pressing the door unlocking button or the door locking button of the remote key 1. Further, as will be described in detail later, the determination unit 61 determines a ventilation mode in the vehicle based on an instruction signal input by the user by pressing the ventilation button of the remote key 1. The ventilation control unit 62 receives a determination result of the determination unit 61 and executes a selected ventilation mode.

The window control unit 63 controls operation of the window drive unit 72 that opens and closes the window W (a front window, a rear window, a sunroof and the like) by a drive source such as a motor. The door control unit 64 controls operation of the door drive unit 73 that opens and closes the door D (a rear slide door, a back door and the like) by a drive source such as a motor. The power control unit 65 controls operation of the power unit 74 that generates a driving force to the automobile C by a driving source such as an engine or a hybrid motor. The air conditioner control unit 66 controls operation of the air conditioner 75 that performs air conditioning (air blowing, cooling, and heating) inside the vehicle.

[Vehicle Ventilation Control System]

The vehicle ventilation control system X according to the present embodiment includes the communication unit 2, the matching unit 3, the storage unit 4, the measurement unit 5, and the control unit 6.

The ventilation control unit 62 of the control unit 6 in the present embodiment controls ventilation of the vehicle based on an instruction signal (in the present embodiment, a signal based on a ventilation button operation of the remote key 1) of the user during a period from a moment when the user gets out of the vehicle to next boarding. The instruction signal from the user is received by the reception unit 2b through wireless communication and transmitted to the determination unit 61. Then, the ventilation control unit 62 controls ventilation of the vehicle according to a ventilation mode determined by the determination unit 61. In this way, the ventilation control unit 62 performs ventilation control based on the instruction signal input by the user after getting off the vehicle so that the in-vehicle temperature T at the time of the next boarding of the user would be a comfortable temperature. Therefore, the vehicle can be ventilated at any timing. Specific contents of the determination unit 61 and the ventilation control unit 62 in the present embodiment will be described below.

Security states of the automobile C include four states of a "non-alert state", an "alert preparation state", an "alert state", and an "alarm state". The "non-alert state" refers to a situation in which the user is on board or has a boarding intention of getting closer to the vehicle than a predetermined distance and the security sensor 54 is in a standby state. The "alert preparation state" refers to a situation in which the user is intended to get off the vehicle, which is a state of preparing for the "alert state" described below. The "alert state" is a situation in which the user gets out of the vehicle and is away from the vehicle and the security sensor 54 is in the standby state. In the "alert state", duration in which the security sensor 54 detects no one other than the user is equal to or longer than a predetermined time period. The "alarm state" is a situation in which unauthorization is detected by the security sensor 54 under the "alert state" when an alarm sounds to notify the user of the alarm state.

The determination unit 61 determines the security state of the automobile C (one of the "non-alert state", the "alert preparation state", the "alert state", and the "alarm state") based on whether the power unit 74 is operated (on and off of the ignition switch), a response signal (inside and outside of the detection area) and an instruction signal (locking and unlocking) from the remote key 1, and a detection signal from the security sensor 54.

When the determination unit 61 determines that it is in the "alert state" or the "non-alert state" and the instruction information input by the user exists, the determination unit 61 determines and selects a ventilation mode for ventilating the vehicle. Ventilation modes according to the present embodiment include at least three modes of an "automated ventilation mode", a "forced ventilation mode", and a "reservation ventilation mode". As the instruction information input by the user, one pressing of the ventilation button of the remote key 1 stands for the "automated ventilation mode", two pressing stands for the "forced ventilation mode", and a long-time pressing stands for the "reservation ventilation mode", which is set in advance.

The "automated ventilation mode" is a mode in which ventilation and cooling is performed so that the in-vehicle temperature T would not become equal to or higher than a predetermined temperature until the user gets on board next time after getting off the vehicle. The "forced ventilation mode" is a mode in which the in-vehicle temperature T is rapidly decreased in a short time immediately before the user gets on board or until the next boarding under an instruction of the user. The "reservation ventilation mode" is a mode in which the in-vehicle temperature T is rapidly decreased in a short time when it comes to the "non-alarm state" (the remote key 1 is in the detection area) in a case of ventilation reservation.

When the determination unit 61 determines the "alert state" and the "automated ventilation mode", the ventilation control unit 62 transmits a control signal to the window control unit 63, the power control unit 65, and the air conditioner control unit 66 based on measured values of the temperature sensor 51, the raindrop sensor 55, and the battery sensor 56.

A specific control example of the "automated ventilation mode" is to open the window W to an extent at which human hands cannot be inserted (for example, less than 3 cm) when a measured value measured by the temperature sensor 51 (hereinafter, also referred to as "in-vehicle temperature T") is equal to or higher than a first predetermined temperature T1 (for example, 25° C.) and lower than a second predetermined temperature T2 (for example, 30° C.). When the in-vehicle temperature T is equal to higher than the second predetermined temperature T2 (for example, 30° C.) and lower than a third predetermined temperature T3 (for example, 35° C.) that is higher than the predetermined temperature T2, the window W is opened to the extent that human hands cannot be inserted (for example, less than 3 cm) and an air blowing function of the air conditioner 75 is activated. During the activation of the air blowing function, when a remaining amount of battery by the battery sensor 56 becomes equal to or less than a predetermined value, the air blowing function of the air conditioner 75 is stopped. Further, when the in-vehicle temperature T is equal to or higher than the third predetermined temperature T3 (for example, 35° C.), the window W is opened to the extent that human hands cannot be inserted (for example, less than 3 cm), a cooling function of the air conditioner 75 is activated while an engine of the power unit 74 is operated. The ventilation control unit 62 may control the actuation temperature of the cooling function of the air conditioner 75 based on a measured value of the temperature sensor 51. All windows W are closed when rain is detected by the raindrop sensor 55 during the actuation of the "automated ventilation mode". Then, when the determination unit 61 determines a transition from the "alert state" to the "non-alert state", the "automated ventilation mode" is canceled, the window W is closed, and the actuation of the air conditioner 75 is stopped or set to a weak level. The ventilation control unit 62 controls an opening and closing degree of the window W, the actuation temperature and an actuation air amount of the cooling function of the air conditioner 75, and an actuation air amount of the air blowing function of the air conditioner 75 based on the measured value of the temperature sensor 51.

The ventilation control unit 62 transmits a control signal to the window control unit 63, the door control unit 64, the power control unit 65, and the air conditioner control unit 66 based on the measured value of the raindrop sensor 55 when the "forced ventilation mode" is determined by the determination unit 61. As a specific control example of the "forced ventilation mode", when rain is not detected by the raindrop sensor 55, the window W is fully opened, the door D is fully opened, and the cooling function of the air conditioner 75 is activated while the engine of the power unit 74 is operated. At this time, in terms of security, the fully-opened door D is preferably a door D (a rear slide door or the like) on a side where the user is detected by a camera outside the vehicle, the remote key 1, or the like. Further, in terms of ventilation efficiency, the fully-opened door D is preferably a pair of doors D on a diagonal line (for example, a right front door and a left rear slide door driven by a motor or the like). In this case, the pair of diagonal doors D may have different degrees of opening in which the door D on the user side is fully opened and the door D on a side where the user does not exist has a small degree of opening. On the other hand, when rain is detected by the raindrop sensor 55, the cooling function of the air conditioner 75 is activated while the engine of the power unit 74 is operated in a state where the window W and the door D are fully closed. Then, when it is detected by the in-vehicle camera or the like that a driver gets on board and gets seated, the "forced ventilation mode" is released, the door D is locked, and the activation of the cooling function of the air conditioner 75 is stopped or set to a weak level. The ventilation control unit 62 controls the operation temperature and the operation air amount of the cooling function of the air conditioner 75, and the operation air amount of the air blowing function of the air conditioner 75 based on the measured value of the temperature sensor 51.

The ventilation control unit 62 transmits a control signal to the window control unit 63, the door control unit 64, the power control unit 65, and the air conditioner control unit 66 based on the measured value of the raindrop sensor 55 when the "non-alert state" and the "reservation ventilation mode" are determined by the determination unit 61. As a specific control example of the "reservation ventilation mode", when the remote key 1 is detected in the detection area by the communication unit 2 and rain is not detected by the raindrop sensor 55, the window W is fully opened, the door D is fully opened, and the cooling function of the air conditioner 75 is activated while the engine of the power unit 74 is operated. At this time, in terms of security, the fully-opened door D is preferably a door D (the rear slide door or the like) on the side where the user is detected by a camera outside the vehicle, the remote key 1, or the like. Further, in terms of ventilation efficiency, the fully-opened door D is preferably a pair of doors D on a diagonal line (for example, the right front door and the left rear slide door when driven by a motor or the like). On the other hand, when the remote key 1 is detected in the detection area by the communication unit 2 and rain is detected by the raindrop sensor 55, the cooling function of the air conditioner 75 is activated while the engine of the power unit 74 is operated in a state where the window W and the door D are fully closed. Then, when it is detected by the in-vehicle camera or the like that a driver gets on board and gets seated, the "reservation ventilation mode" is released, the door D is locked, and the activation of the cooling function of the air conditioner 75 is stopped or set to a weak level. The ventilation control unit 62 controls the operation temperature and the operation air amount of the cooling function of the air conditioner 75 and the operation air amount of the air blowing function of the air conditioner 75 based on the measured value of the temperature sensor 51.

Next, a specific control method will be described with reference to FIGS. 2 to 4.

Figure 2:
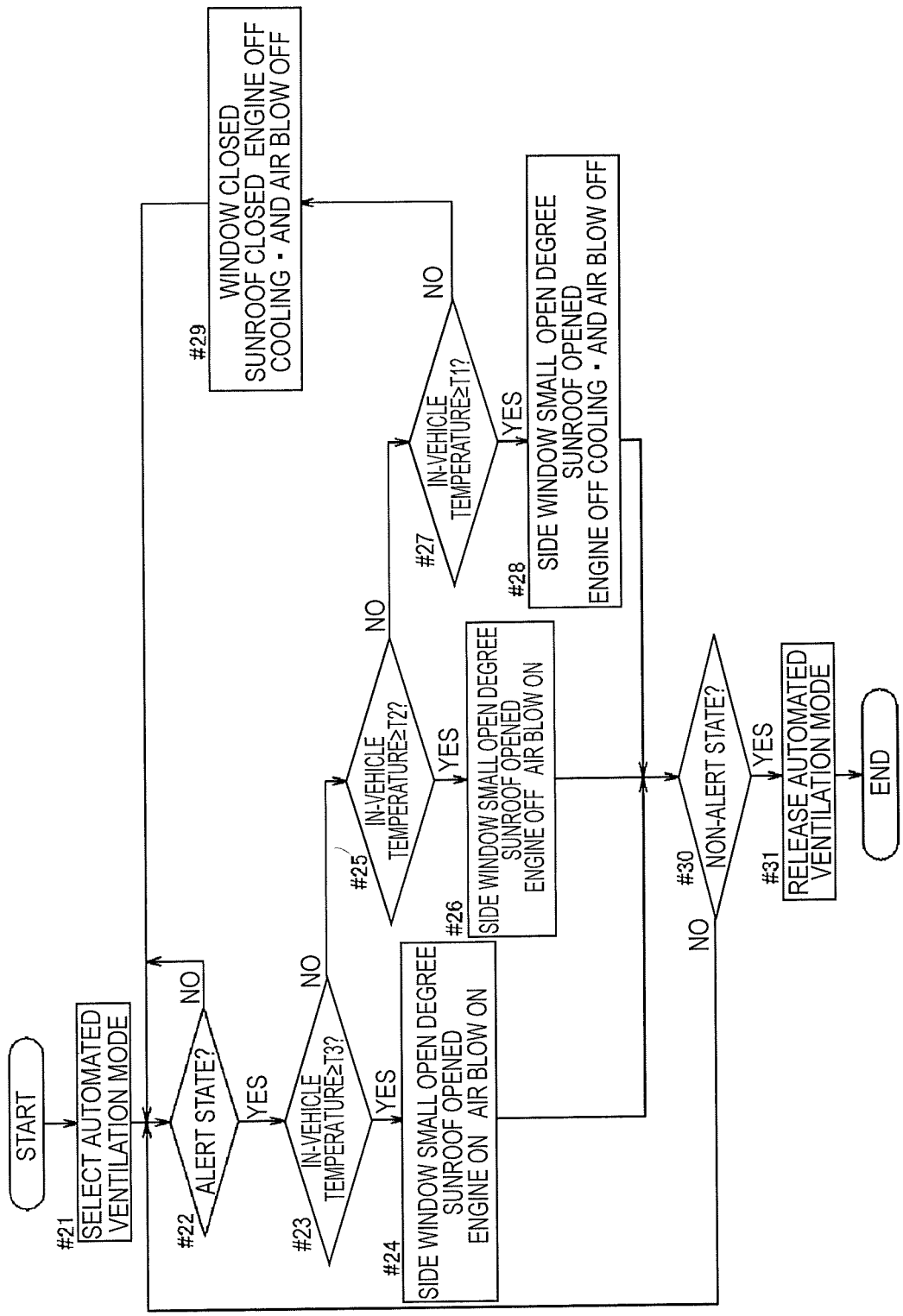
FIG. 2 is a flow diagram showing an automated ventilation mode of a vehicle ventilation control system.

FIG. 2 shows a flow diagram of the "automated ventilation mode". First, after turning off the ignition switch and getting off the vehicle, the user presses the ventilation button of the remote key 1 once to select the "automated ventilation mode" (#21). At this time, the determination unit 61 determines the security level of the "alert preparation state" which is a state where the user is intended to get off the vehicle. Then, the determination unit 61 determines that the "automated ventilation mode" has been selected via the reception unit 2*b* and determines whether or not the security level is the "alert state" (#22). As a result of the determination by the determination unit 61, when the security level is the "alert state" (#22 Yes), the determination unit 61 transmits a signal to allow the ventilation control unit 62 to execute the "automated ventilation mode". For example, the "alert preparation state" is shifted to the "alert state" after a predetermined time period elapses since the user gets off the vehicle and presses the ventilation button of the remote key 1.

When the in-vehicle temperature T measured by the temperature sensor 51 is equal to or higher than the third predetermined temperature T3 (for example, 35° C.) (#23 Yes), the ventilation control unit 62 causes a side window W (one of left and right front windows and left and right rear windows), and a skylight W (a sunroof) to open, and performs control to activate the cooling function of the air conditioner 75 while causing the engine of the power unit 74 (#24) to operate. At this time, the side window W is opened to such a degree that a human hand cannot be inserted (for example, less than 3 cm) in consideration of security. In this way, when the in-vehicle temperature T is equal to or higher than the third predetermined temperature T3, the in-vehicle temperature T can be rapidly lowered in a short time without reducing the remaining battery amount if the engine is operated and the cooling function of the air conditioner 75 is activated. Therefore, for example, even when the user leaves fresh food in the vehicle while leaving the automobile C for a certain period of time, it is possible to prevent inconvenience such as deterioration of fresh food due to a sudden increase of the in-vehicle temperature T.

When the in-vehicle temperature T measured by the temperature sensor 51 is equal to or higher than the second predetermined temperature T2 (for example, 30° C.) and lower than the third predetermined temperature T3 (for example, 35° C.) (#23 No, #25 Yes), the ventilation control unit 62 causes a side window W (one of the left and right front windows and the left and right rear windows) and the skylight W (the sunroof) to open, and performs control to activate the air blowing function of the air conditioner 75 while the engine of the power unit 74 is off (#26). At this time, the side window W is opened to such a degree that a human hand cannot be inserted (for example, less than 3 cm) in consideration of security. In this way, when the in-vehicle temperature T is equal to or higher than the second predetermined temperature T2, ventilation can be promoted and the in-vehicle temperature T can be lowered if the air blowing function of the air conditioner 75 is activated.

When the in-vehicle temperature T measured by the temperature sensor 51 is equal to or higher than the first predetermined temperature T1 (for example, 25° C.) and lower than the second predetermined temperature T2 (for example, 30° C.) (#25 No, #27 Yes), the ventilation control unit 62 performs control to open the side window W (one of the left and right front windows and left and right rear windows) and the skylight W (the sunroof) (#28) in a state where the engine of the power unit 74 and the air blowing function of the air conditioner 75 are turned off. At this time, the side window W is opened to such a degree that a human hand cannot be inserted (for example, less than 3 cm) in consideration of security. In this way, it is possible to prevent intrusion and an increase in the in-vehicle temperature T if the window W is opened to the extent that a human hand cannot be inserted.

When the in-vehicle temperature T measured by the temperature sensor 51 is lower than the first predetermined temperature T1 (for example, 25° C.) (#27 No), the ventilation control unit 62 performs control to close the side window W (one of the left and right front windows and left and right rear windows) and the skylight W (the sunroof) (#29) in a state where the engine of the power unit 74 and the air blowing function of the air conditioner 75 are turned off.

The ventilation control unit 62 repeats the control from #22 to #29 until the determination unit 61 determines the "non-alert state" (the situation where the user is on board or has an intention of getting closer to the vehicle than a predetermined distance) (#30 No). Although not shown, in the control from #22 to #29, the ventilation control unit 62 executes control to close at least the sunroof when rain is detected by the raindrop sensor 55. As a result, raindrops would not enter the vehicle to get the inside immersed by closing the sunroof even when the window W is opened to such an extent (for example, less than 3 cm) that the side window W cannot be inserted by a human hand.

When the determination unit 61 determines the "non-alert state" (#30 Yes), the ventilation control unit 62 releases the control of the "automated ventilation mode" (#31). At this time, the ventilation control unit 62 may cause the window W to close and stop the air conditioner 75, or may close the window W and set the cooling function of the air conditioner 75 to a weak level.

Figure 3:
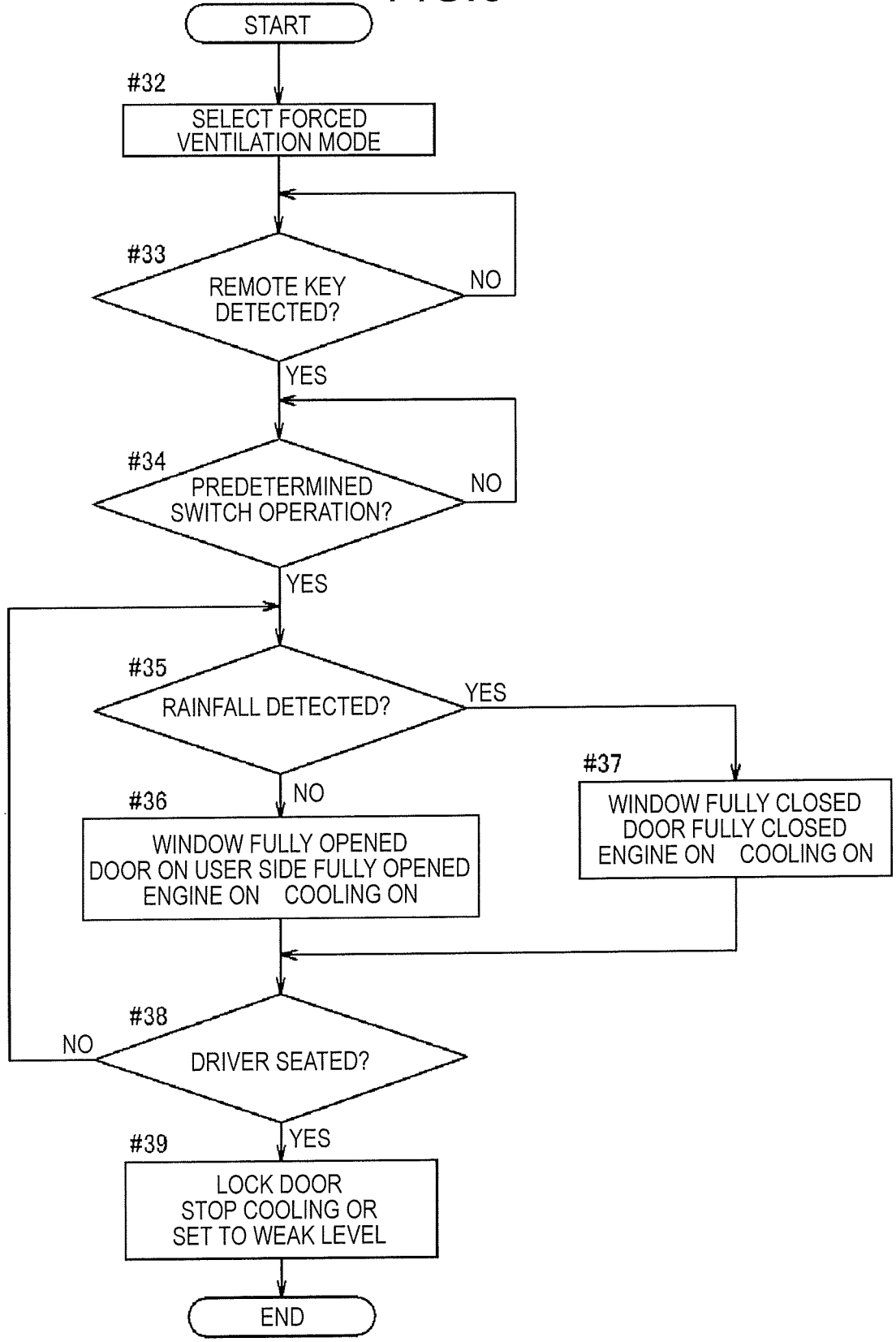
FIG. 3 is a flow diagram showing a forced ventilation mode of the vehicle ventilation control system.

FIG. 3 is a flowchart of the "forced air ventilation mode". First, during a period from a moment of turning off the ignition switch and getting off the vehicle to the next boarding (immediately before the next boarding or until the next boarding), the user presses the ventilation button of the remote key 1 twice to select the "forced ventilation mode" (#32). Then, upon receiving a response signal from the remote key 1 in the detection area, the matching unit 3 matches the response signal with an authentication signal (#33). When the response signal and the authentication signal match with each other (#33 Yes), the determination unit 61 determines the operation state of the door drive unit 73 by the button operation of the remote key 1 (#34). When the operation state of the door drive unit 73 is a door unlocking state or when the operation state of the door drive unit 73 is a back door opening operation state (#34 Yes), the determination unit 61 determines that the security level is in the "non-alert state" and the raindrop sensor 55 detects the rainfall amount (#35).

When rain is not detected by the raindrop sensor 55 or the rainfall amount is small (#35 No), the ventilation control unit 62 causes the window W (the left and right front windows, the left and right rear windows, and the sunroof) to fully open, causes the rear slide door D (an example of the door) on the user side to fully open, and executes control to activate the cooling function of the air conditioner 75 while causing the engine of the power unit 74 (#36) to operate. The door D is fully opened in a state where the security sensor 54 ensures safety of the surroundings. Accordingly, the in-vehicle temperature T can be rapidly lowered in a short time without reducing the remaining battery amount. It should be noted that not only the rear slide door D on the user side but also the pair of front doors D (an example of doors) on a diagonal line relative to the rear slide door D on the user side may be opened, or all doors D (the front doors, the rear slide door and the back door) may be opened.

When rain is detected by the raindrop sensor 55 (#35 Yes), the ventilation control unit 62 executes control to activate the cooling function of the air conditioner 75 while causing the engine of the power unit 74 to operate in a state where the window W and the door D are closed (#37). Accordingly, it is possible to lower the in-vehicle temperature T while preventing raindrops from entering the vehicle to get the inside water immersed.

Next, when the determination unit 61 determines that the driver gets on board and gets seated by the in-vehicle camera or the like (#38 Yes), the ventilation control unit 62 executes control to close the window W and stop or set the air conditioner 75 to a weak level (#39). At this time, when the measured value of the temperature sensor 51 does not reach a target temperature, the state in which the window W is fully opened and the cooling function of the air conditioner 75 is activated may be maintained. When the door D is opened as in the present embodiment, the ventilation speed can be improved as compared with a case where only the window W is opened. Therefore, ventilation can be promoted and the in-vehicle temperature T can be further lowered in a short time even when an instruction signal of the user is received before boarding (immediately before the next boarding or until the next boarding).

Figure 4:
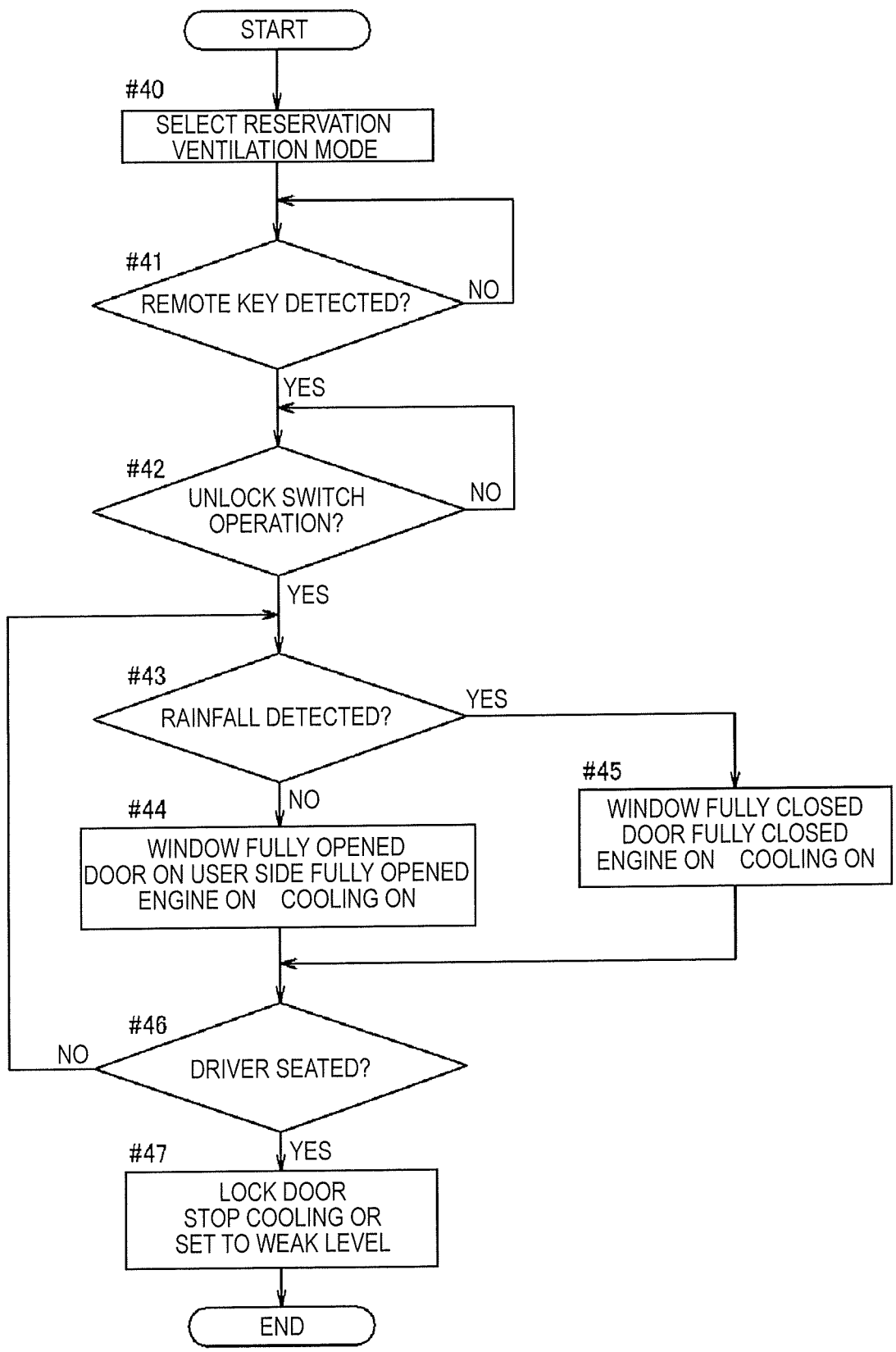
FIG. 4 is a flow diagram showing a reservation ventilation mode of the vehicle ventilation control system.

FIG. 4 is a flowchart of the "reservation ventilation mode". First, after turning off the ignition switch and getting off the vehicle, the user long-time presses the ventilation button of the remote key 1 to select the "reservation ventilation mode" (#40). Then, upon receiving the response signal from the remote key 1 in the detection area, the matching unit 3 matches the response signal with an authentication signal at the time of the next boarding of the user (#41). When the response signal and the authentication signal match with each other (#41 Yes), the determination unit 61 determines the operation state of the door drive unit 73 by the button operation of the remote key 1 (#42). When the operation state of the door drive unit 73 is the door unlocking state (#42 Yes), the determination unit 61 determines that the security level is in the "non-alert state", and the raindrop sensor 55 detects the rainfall amount (#43).

When rain is not detected by the raindrop sensor 55 or the rainfall amount is small (#43 No), the ventilation control unit 62 causes the window W (the left and right front windows, the left and right rear windows, and the sunroof) to fully open, and causes the rear slide door D (an example of the door) on the user side to fully open, and executes control to activate the cooling function of the air conditioner 75 while causing the engine of the power unit 74 (#44) to operate. The rear slide door D is fully opened in a state where the security sensor 54 ensures safety of the surroundings. Accordingly, the in-vehicle temperature T can be rapidly lowered in a short time without reducing the remaining battery amount. It should be noted that not only the rear slide door D on the user side but also the front doors D on the diagonal line relative to the rear slide door D on the user side may be opened, or all doors D (the front door, the rear slide door and the back door) may be opened.

When rain is detected by the raindrop sensor 55 (#43 Yes), the ventilation control unit 62 executes control to activate the cooling function of the air conditioner 75 while causing the engine of the power unit 74 to operate in a state where the window W and the door D are closed (#45). Accordingly, it is possible to lower the in-vehicle temperature T while preventing raindrops from entering the vehicle to get the inside water immersed.

Next, when the determination unit 61 determines that the driver gets on board and get seated by the in-vehicle camera or the like (#46 Yes), the ventilation control unit 62 executes control to fully close the window W and stop or set the air conditioner 75 to the weak level (#47). At this time, when the measured value of the temperature sensor 51 does not reach a target temperature, a state in which the window W is fully opened and the cooling function of the air conditioner 75 is activated may be maintained. When the door D is opened as in the present embodiment, the ventilation speed can be improved as compared with the case where only the window W is opened. Therefore, ventilation can be promoted and the in-vehicle temperature T can be further lowered even when an instruction signal of the user is received before boarding (when getting off the vehicle).

Other Embodiments (1) The unlocking button may be long-time pressed or the like instead of providing the ventilation button on the remote key 1 for setting the "forced ventilation mode" and the "reservation ventilation mode". In addition, when a ventilation door designation button is provided on the remote key 1 to specify the door D to be ventilated, the door D on a ventilation door designation button side may be fully opened.

(2) The locking button may be long-time pressed instead of providing the ventilation button on the remote key 1 for setting the "automated ventilation mode". In addition, the selection of the "automated ventilation mode" may refer to receiving instruction information from the user at a remote location by the reception unit 2b via the Internet. In this case, instruction information can be input any time even when the user is shopping, for example, and accordingly convenience is improved. Further, the remote key 1 may have a function of cancelling the "automated ventilation mode" in the ventilation button.

(3) A smart key system may be provided to automatically unlock the door when the remote key 1 enters the detection area and automatically lock the door when the remote key 1 is out of the detection area. In this case, the door locking button and the door unlocking button of the remote key 1 may be omitted.

(4) The "automated ventilation mode" and the "reservation ventilation mode" may be set in advance using a touch panel, an operation button, or the like of the operation unit 71. In this case, a user who once inputs an instruction signal would not need to select the ventilation mode every time he/she gets in and off the vehicle and convenience is improved.

(5) In the "automated ventilation mode", although the determination unit 61 determines a ventilation method based on the in-vehicle temperature T measured by the temperature sensor 51, the ventilation mode may be periodically (for example, every minute) determined by predicting a temperature rise rate based on weather information or temperature information inside and outside the vehicle of the temperature sensor 51.

(6) In the "automated ventilation mode", the window W may be opened to such a degree that a human hand cannot be inserted (for example, less than 3 cm) in consideration of security.

(7) In the "forced ventilation mode" and the "reservation ventilation mode", the door D may be opened to a predetermined degree instead of fully opening the window W or the door D.

(8) The door D opened and closed by the door drive unit 73 may be a front door formed of an automatic swing door in addition to a rear slide door or a back door, and is not particularly limited as long as it is a door D driven by a drive source such as a motor.

(9) Although the reception unit 2b of the communication unit 2 is described as the reception unit in the embodiment described above, the determination unit 61 may be regarded as the reception unit since the instruction signal input by the user is used in the determination unit 61.

(10) The vehicle ventilation control system X according to the embodiment described above may be suitable for vehicles other than the automobile C.

INDUSTRIAL APPLICABILITY

The embodiments disclosed here are applicable to a vehicle ventilation control system that controls ventilation of a vehicle after a user gets off the vehicle.

A feature of a vehicle ventilation control system according to an aspect of this disclosure resides in that the vehicle ventilation control system includes a reception unit that receives an instruction signal input by a user via wireless communication, and a control unit that controls ventilation inside a vehicle based on the instruction signal, in which the control unit performs ventilation control to control the ventilation based on the instruction signal input during a period after the user gets out of the vehicle to next boarding.

In this configuration, ventilation control is performed so that an in-vehicle temperature at the time of the next boarding of the user is a comfortable temperature based on the instruction signal input by the user after getting off the vehicle. Therefore, it is not necessary to always acquire GPS information as in the related art and the vehicle can be ventilated at any timing regardless of whether or not the user is approaching the vehicle. For example, when the user leaves fresh food in the vehicle for a predetermined time period, deterioration of fresh food can be prevented if the user inputs instruction information at any timing after getting off the vehicle. In addition, comfort of cabin space is maintained since the in-vehicle temperature at the time of the next boarding of the user is lowered. In this way, a vehicle ventilation control system having a high degree of freedom in which comfort of a user can be improved can be provided.

Another feature resides in that the control unit causes an engine of the vehicle to operate, activates a cooling function of an air conditioner, and causes a door to open as the ventilation control.

When the door is open as in this configuration, the ventilation speed can be improved as compared with a case where only a window is open. Therefore, ventilation can be promoted and the in-vehicle temperature can be further lowered when an instruction signal of the user is received before boarding.

Another feature resides in that the vehicle ventilation control system further includes a raindrop sensor that detects a rainfall amount, and the control unit controls, as the ventilation control, opening and closing of at least one of a window and a door of the vehicle based on a detection signal of the raindrop sensor.

When the window and/or the door are opened for ventilation, raindrops may enter the vehicle to get the inside immersed with water. On the other hand, as in this configuration, ventilation can be performed while preventing intrusion of raindrops into the vehicle by controlling the opening and closing of at least one of the window and the door based on the detection signal of the raindrop sensor.

Another feature resides in that the vehicle ventilation control system further includes a temperature sensor that measures an internal temperature of the vehicle, and the control unit causes, as the ventilation control, the window of the vehicle to open to an extent that does not allow a human hand to insert when the measured value of the temperature sensor is equal to or higher than a first predetermined temperature.

As in this configuration, it is possible to prevent intrusion and an increase in the in-vehicle temperature if the window is opened to the extent that does not allow the human hand to insert when the vehicle interior temperature is equal to or higher than the first predetermined temperature while monitoring the in-vehicle temperature by the temperature sensor.

Another feature resides in that the control unit further activates, as the ventilation control, an air blowing function of the air conditioner when the measured value of the temperature sensor is equal to or higher than a second predetermined temperature that is higher than the first predetermined temperature.

As in this configuration, if the air blowing function of the air conditioner is activated when the in-vehicle temperature is equal to or higher than the second predetermined temperature that is higher than the first predetermined temperature, ventilation can be promoted and the in-vehicle temperature can be lowered.

Another feature resides in that the control unit further causes an engine of the vehicle to operate and activate a cooling function of an air conditioner as the ventilation control when the measured value of the temperature sensor is equal to or higher than a third predetermined temperature that is higher than the second predetermined temperature.

As in this configuration, the in-vehicle temperature can be rapidly lowered in a short time without reducing a remaining battery amount if the engine is operated and the cooling function of the air conditioner is activated when the in-vehicle temperature is equal to or higher than the third predetermined temperature. Therefore, for example, even when the user leaves fresh food in the vehicle while leaving the vehicle for a certain period of time, it is possible to prevent inconvenience such as deterioration of fresh food due to a sudden increase of the in-vehicle temperature.

Another feature resides in that the vehicle ventilation control system further includes a detection sensor that detects a person who is other than the user and touches the vehicle, and the control unit performs the ventilation control after a period in which the detection sensor detects no one other than the user continues for a predetermined time period or more.

As in this configuration, it is possible to ensure security even when the window is opened if the control unit performs ventilation control in a state where an intruder would be alerted although the intruder does not touch the vehicle.

Another feature resides in that the control unit activates, as the ventilation control, a cooling function of an air conditioner.

Another feature resides in that the control unit causes the door to open as the ventilation control.

Another feature resides in that the control unit causes the window of the vehicle to open as the ventilation control.

Another feature resides in that the control unit activates, as the ventilation control, the air blowing function of an air conditioner.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle ventilation control system comprising:
   a wireless receiver that receives an instruction signal input by a user via wireless communication;
   an electronic control unit that controls ventilation inside a vehicle based on the instruction signal;
   a temperature sensor that measures an internal temperature of the vehicle; and
   a detection sensor that detects a person who is other than the user, wherein
   during a period after the user gets out of the vehicle until a next boarding, the electronic control unit performs ventilation control in accordance with a ventilation mode based on the instruction signal input, the ventilation mode including an automated ventilation mode and a forced ventilation mode,
   in the automated ventilation mode, the electronic control unit performs the ventilation control so that internal temperature of the vehicle measured by the temperature sensor does not become equal or greater than a predetermined temperature,
   the electronic control unit determines the vehicle is in an alert state when the detection sensor detects no person other than the user for longer than a predetermined time,
   the electronic control unit starts the automated ventilation mode when the alert state is determined,
   in the automated ventilation mode when a first predetermined temperature measured by the temperature sensor is exceeded, at least one of a window and a sunroof of the vehicle is opened as the ventilation control,
   in the automated ventilation mode when a second predetermined temperature measured by the temperature sensor is exceeded, that is greater than the first predetermined temperature, the ventilation control additionally includes activating an air blowing function of an air conditioner,
   in the automated ventilation mode when a third predetermined temperature measured by the temperature sensor is exceeded, that is greater than the second predetermined temperature, the ventilation control additionally includes starting an engine of the vehicle and activating a cooling function of the air conditioner,
   the electronic control unit determines the vehicle is in a non-alert state when the detection sensor detects the user while in the alert state, and
   the electronic control unit ends the automated ventilation mode when the non-alert state is determined.

2. The vehicle ventilation control system according to claim 1, further comprising:
   a raindrop sensor that detects a rainfall amount, wherein
   the electronic control unit controls, as the ventilation control, opening and closing of at least one of a window and a door of the vehicle based on a detection signal of the raindrop sensor.

3. The vehicle ventilation control system according to claim 1,
   wherein
   the electronic control unit causes, as the ventilation control, a window of the vehicle to open 3 cm or less when a measured value of the temperature sensor is equal to or higher than the first predetermined temperature.

4. The vehicle ventilation control system according to claim 1, wherein
   the electronic control unit causes a door to open as the ventilation control.

* * * * *